(12) United States Patent
Shaffer, II et al.

(10) Patent No.: US 7,613,925 B2
(45) Date of Patent: Nov. 3, 2009

(54) METHOD FOR AUTHENTICATING A MESSAGE

(75) Inventors: Ronald L. Shaffer, II, Elgin, IL (US);
Michael W. Bright, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 1075 days.

(21) Appl. No.: 10/340,370

(22) Filed: Jan. 10, 2003

(65) Prior Publication Data
US 2004/0139321 A1 Jul. 15, 2004

(51) Int. Cl.
*G06F 7/04* (2006.01)
(52) U.S. Cl. ..................................... 713/170
(58) Field of Classification Search ............... None
See application file for complete search history.

(56) References Cited

U.S. PATENT DOCUMENTS

| | | | | |
|---|---|---|---|---|
| 5,651,069 | A * | 7/1997 | Rogaway | 380/28 |
| 6,226,742 | B1 | 5/2001 | Jakubowski et al. | |
| 2002/0165912 | A1* | 11/2002 | Wenocur et al. | 709/203 |

FOREIGN PATENT DOCUMENTS

EP 0678 836 A1 10/1995
EP 0725 511 A3 7/1999

OTHER PUBLICATIONS

Alfred Menezes, Paul van Oorschot, Scott Vanstone; Handbook of Applied Cryptography; 1997; CRC Press; Chapter 9.*
Bellare et al. The Security of the Cipher Block Chaining Message Authentication Code Sep. 12, 2001 pp. 3, 13 and 16.*
Bart Preneel and Paul C. Van Oorschot, MDx_MAC and Building Fast MACs from Has Functions, Proceedings Crypto '95, Springer-Verlag LNCS, Aug. 1995, 14 pages, N. F.W.O. postdoctoral researcher, sponsored by the National Fund for Scientific Research (Belgium).
AES Key Wrap Specification, National Institute of Standards and Technology, Nov. 16, 2001, 23 pages.

* cited by examiner

*Primary Examiner*—Emmanuel L Moise
*Assistant Examiner*—David J Pearson
(74) *Attorney, Agent, or Firm*—Terri S. Hughes; Valerie M. Davis

(57) ABSTRACT

A transmitting device (100) generates a message (102). The message has a message length (104) and comprises message data (106). A key input (108) is identified, and a message authentication key (112) is derived based on the key input and the message length. Based on the message authentication key and the message data, a message authentication code (118) is derived, which is used to authenticate the message.

16 Claims, 1 Drawing Sheet

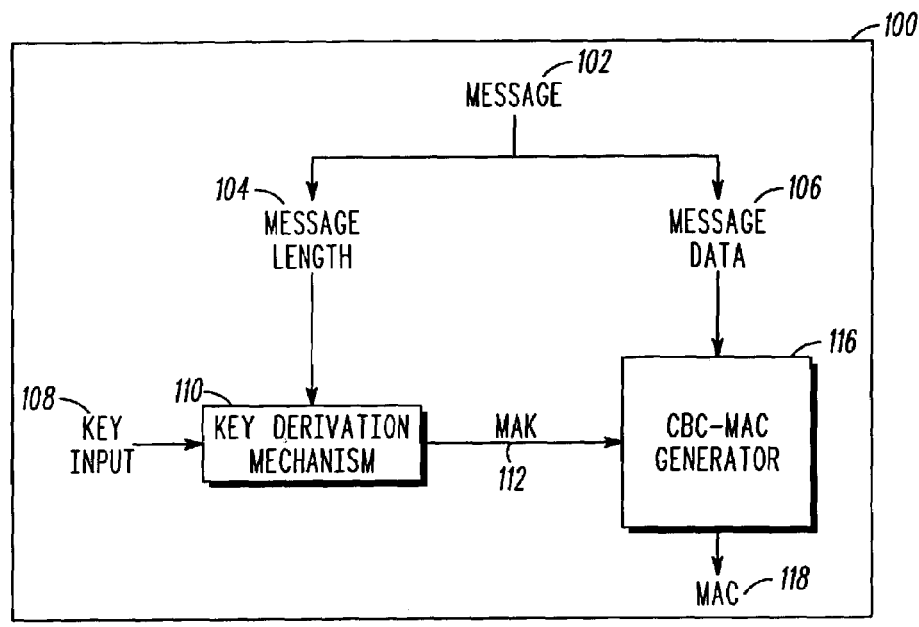
FIG. 1
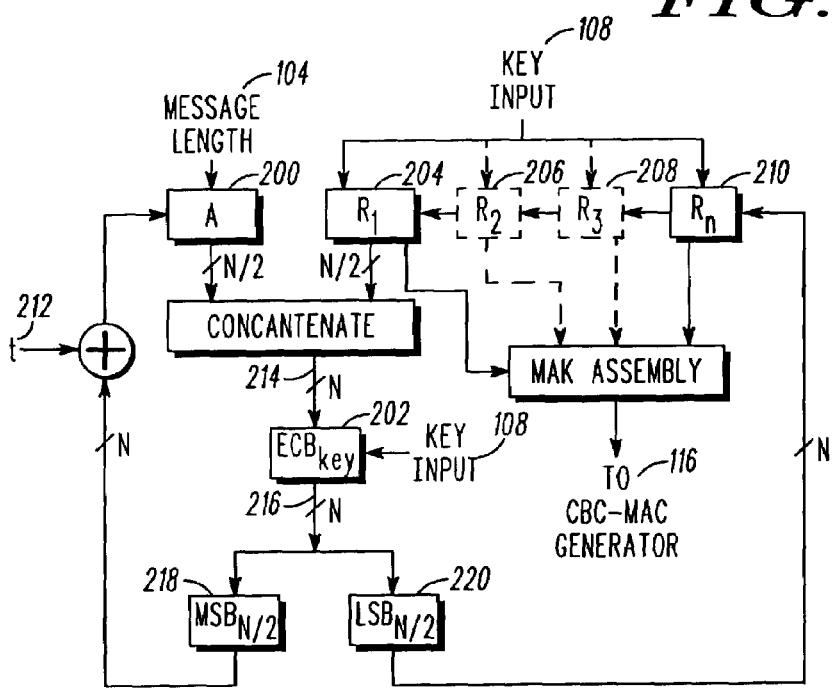
FIG. 2
| KEY DERIVATION ALGORITHM | CBC-MAC ALGORITHM | N (bits) | N/2 (bits) | MAC LENGTH (bits) |
|---|---|---|---|---|
| DES | DES | 64 | 32 | ≥32 |
| TRIPLE DES | TRIPLE DES | 64 | 32 | ≥32 |
| AES (128, 192, 256) | AES (128, 192, 256) | 128 | 64 | ≥64 |
FIG. 3

METHOD FOR AUTHENTICATING A MESSAGE

FIELD OF THE INVENTION

The present invention relates generally to a method for authenticating a message.

BACKGROUND OF THE INVENTION

It is well know by those skilled in the art that messages can be authenticated using an encryption algorithm operated in the cipher block chaining ("CBC") mode to generate a message authentication code ("MAC"). Two disadvantages of using CBC mode for authentication are key management complexity and possible compromise due to forgery extension.

Sharing keys between security services (e.g., confidentiality, authentication, etc.) can potentially compromise the security of the entire system; if a shared key for one security service is compromised due to weakness in either the design of the security service, the security algorithms, or the particular implementation of the security service, then the shared key is compromised for all security services in which the key is shared. Therefore, it is common practice, and rightfully so, to use separate and independent keys for different security services. This, however, increases the number of keys used in a system, and thus greatly increases the key management complexity of that system. For a small system with a limited number of users and cryptographic devices, this may not be an issue, but as the size of the system and number of cryptographic devices increases, the complexity and burden of key management greatly increases. For large systems that use authentication as well as other security services, the key management requirements can easily exceed the users management capabilities as well as the performance abilities of the system to distribute keys.

The internal structure of CBC-MAC facilitates the possibility of forging a message by simply collecting message-MAC pairs; this has been published and discussed widely in academic literature. By collecting enough message-MAC pairs to find two different messages with the same MAC and also having the same resulting MAC after an identical arbitrary string is appended to both messages, a message with an authentic MAC can be forged. This type of an attack against CBC-MAC is known as a forgery extension attack. A possible solution to a forgery extension attack is to manage different keys for authenticating keys of different lengths, thus increasing the key management needs further.

Some solutions for easing the key management and forgery extension issues have been proposed. To solve the key management problem, systems can use a public key infrastructure ("PKI") based on public key cryptography to either provide digital signatures for authentication or to allow for automatic key exchange or key agreement of authentication keys as well as keys for other security services. PKI, however, can increase the cost of development as well as the cost of the system as other devices are needed, such as a certificate authority. PKI also comes with its complexity as certificate revocation lists ("CRLs") must be maintained and distributed. Public key cryptography has its own disadvantages in that it tends to be slower, requires more bandwidth for communication, and the state of the art does not allow for simultaneous multipoint key agreement or key exchange.

Other MAC algorithms have also been proposed based on constructions other than CBC-MAC that do not succumb to forgery extension attacks. For example, hash message authentication code ("HMAC") is based on using hash algorithms, such as message digest v5 ("MD5") or secure hash algorithm v1 ("SHA-1"), with a secret key to generate MACs. The disadvantage here is one of interoperability and engineering resources. CBC-MAC has been an established authentication mechanism for many years, and as such, millions of existing devices, protocols, and standards use CBC-MAC, making CBC-MAC necessary to easily retrofit these architectures with a replacement. Many of these systems also have limited resources (millions of instructions per second ("MIPS"), memory, gates, etc.) such that the ability to use core constructions between security services is necessary. The ability to use a core construction for authentication and other security services such as confidentiality is an advantage for these systems. Solutions, such as HMAC, for example, cannot be reused for confidentiality that makes these solutions less than acceptable, but CBC can be used in both authentication and confidentiality. Because the current state of the art public key cryptography technologies are not acceptable for confidentiality, except for key distribution, due to performance and require significant redesign of existing devices, systems, and standards, PKI is also not an acceptable replacement.

Thus, there exists a need to eliminate the forgery extension attack and reduce the number of keys to be managed by a device and/or system. At the same time, it is necessary that the replacement methodology be easy to retrofit into currently implemented systems using a minimum of resources.

BRIEF DESCRIPTION OF THE FIGURES

The features of the present invention are set forth with particularity in the appended claims. The invention, together with its preferred embodiments may be best understood by reference to the accompanying drawings in which:

FIG. 1 illustrates a simple block diagram of cipher block chaining-message authentication code ("CBC-MAC") with key derivation mechanism in accordance with the present invention;

FIG. 2 illustrates a detailed block diagram of the key derivation mechanism of FIG. 1 in accordance with the preferred embodiment of the present invention; and FIG. 3 illustrates a table of alternative cryptographic algorithms used in the key derivation mechanism and the CBC-MAC in accordance with the present invention.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention authenticates a message by securely deriving a message authentication code ("MAC") from the length of the message and from a key input (e.g., a traffic key, a key encryption key, password, etc.) currently stored locally at a transmitting device. An advantage of the present invention is that it only requires systems to manage the key input since the potential compromise of the key used to authenticate the message, hereinafter referred to as the message authentication key ("MAK"), does not compromise the key input. The extra storage space and effort required to key manage separate MAKs is not needed. As will be described in detail below, because the algorithm to derive the MAK is initialized with the length of the message, a different MAK can be derived from the same input key for messages of varying lengths. Thus, another advantage of the present invention is that it reduces or eliminates forgery extension attack, particularly against cipher block chaining ("CBC") MAC, by creating a different MAK for messages of different lengths and reduces the number of keys to be managed by the device and/or system.

FIG. 1 illustrates a simple block diagram of the present invention. In accordance with the present invention, a transmitting device 100 generates a message 102 that requires authentication. The message 102 has a message length 104 and comprises data 106. Upon generation of the message 102, the length of the message 104 and a key input 108 currently stored in the transmitting device 100, for example, a key used for confidentiality, authentication, key encryption, or the like, is inputted into a key derivation mechanism 110. The key derivation mechanism 110 is a secure mechanism for deriving the new key, hereinafter referred to as the MAK, 112 from the key input 108 currently stored and the message length 104. It should be noted that any secure key derivation mechanism may be used and still remain in the spirit and scope of the present invention as long as the mechanism uses the message length 104 of the message 102, in bytes or bits, as an input. Once the MAK 112 is derived, the MAK 112 is used as input, along with the message data 106, into a CBC-MAC generator 116 to authenticate the message 102. The CBC-MAC generator 116 is an authentication process used to derive a MAC value 118; the CBC-MAC generator 116 is commonly known to those skilled in the art, and thus will not be discussed in further detail. The MAC value 118 is then transmitted to a receiving device (not shown) along with the message 102 for authentication purposes.

The preferred embodiment of the key derivation mechanism 110 may be more fully described with reference to FIG. 2 in which like reference numerals refer to like elements from FIG. 1. As shown, when the transmitting device 100 generates the message 102 to be authenticated, Register A 200 is initialized with a value corresponding to the message length 104 of the message 102. The initial value of Register A 200 is padded with zeroes to N/2 bits, where N is the number of bits in the block size of the key derivation algorithm 202. Some examples of the key derivation algorithm 202 are outlined in the table illustrated in FIG. 3. For instance, if the key derivation algorithm 202 is based on the advanced encryption standard ("AES"), the block size, N, equals 128 bits, the initial value of Register A 200 equals the value corresponding to the message length 104 padded with zeroes up to 64 bits (which is N/2); likewise, if the key derivation algorithm 202 is based on the data encryption standard ("DES") or the triple DES algorithm, the block size, N, equals 64 bits, the initial value of Register A 200 equals the value corresponding to the message length 104 padded with zeroes up to 32 bits (which is N/2). It will be obvious to those skilled in the art that other algorithms not outlined in the table illustrated in FIG. 3 may be used and still remain within the spirit and scope of the present invention.

Referring back to FIG. 2, the key derivation mechanism 110 comprises a plurality of registers: Register $R_1$ ... Register $R_n$. For ease of explanation of FIG. 2, it is assumed that the key derivation algorithm 202 utilizes AES-256 that comprises a key having a length of 256 bits, thus Registers $R_1$ ... $R_n$ are initialized with a portion of the value associated with the key input 108 currently stored in the device 100 divided into blocks of N/2 bits (i.e., 64 bits). It should be noted that in the preferred embodiment, Register $R_1$ is initialized with the most significant bits of the key input 108 and Register $R_n$ is initialized with the least significant bits of the key input 108 for ordering purposes. In order to determine the value of n (the number of R registers: $R_1$ ... $R_n$), the number of bits in the key input 108 (which is 256) is divided by N/2 (which is 64); as a result, there are four registers in this example: Register $R_1$ 204, Register $R_2$ 206, Register $R_3$ 208 and Register $R_4$ 210, each containing 64 bits.

The algorithm 202 used in the key derivation mechanism 110 is also initialized with the value of the key input 108. As noted above, some examples of various key derivation algorithms are outlined in the table illustrated in FIG. 3.

Finally, in the preferred embodiment, the value of the counter, t, 212 is initialized to 1. In the present invention, the counter, t, 212 is a loop counter. In the preferred embodiment, the counter, t, 212 increments by 1 until it reaches six times the value of n; in the present example, six times the value of n is 24, thus the iterative process described below will be performed 24 times in this example.

Now that all of the registers 200, 204, 206, 208 and 210 and the counter 212 are initialized, the key derivation mechanism 110 performs its first iteration. For the first iteration, the initial value in Register A (which is N/2 bits long) and the initial value in Register $R_1$ (which is N/2 bits long) are concatenated to create a concatenated value 214 (which is N bits long). An electronic codebook ("ECB") mode of the key derivation algorithm 202 is used to encrypt the concatenated value 214 to create an encrypted output 216. The encrypted output 216 is divided into two N/2 sized blocks: a most significant half 218 (which is N/2 bits long) and a least significant half 220 (which is N/2 bits long). Register A 200 is then set to the value resulting from the most significant half 218 of the encrypted output 216 exclusive-ored with the current value of the counter, t, 212, and Register $R_1$ 204 is set to equal the least significant half 220 of the encrypted output 216. Once Register A 200 and Register $R_1$ 204 are set with their respective new values, the counter, t, 212 is incremented by 1 and the next iteration is performed.

For the second iteration, the current value stored in Register A 200 is now concatenated with the initial value stored in Register $R_2$ 206 and the process repeats itself to create the new concatenated value 214, the new encrypted output 216, and the most significant half 218 and the least significant half 220 of the encrypted output 220. In the second iteration, Register A 200 is then set to the new value resulting from the most significant half 218 exclusive-ored with the current value of the counter, t, 212, and Register $R_2$ 206 is set to equal the current value of the least significant half 220 of the encrypted output 216. Once Register A 200 and Register $R_2$ 206 are set with their respective new values, the counter, t, 212 is again incremented by 1. This iterative process is performed six times n iterations (i.e., t=6*n), continually looping through Registers $R_1$ ... $R_n$ 204-210 until the last iteration is performed. It is important to note that this iterative process can be performed in software, as described, or in hardware by shifting the values of Registers $R_1$ ... $R_n$ to the left and always concatenating the current value of Register A 200 with the current value of Register $R_1$ six times n iterations. Thus, it will be easily understood by those skilled in the art that a combination of software and hardware or other methods of implementing the iterative process in software and/or hardware may be implemented and still remain within the spirit and scope of the present invention; for example, a storage medium can have stored thereon a set of instructions, which when loaded into a hardware device (e.g., a microprocessor, or the like), causes the hardware device to perform the functions of the present invention.

The current values stored in Registers $R_1 \ldots R_n$ after six times n iterations of the iterative process described in FIG. 2 are taken in order to comprise the MAK 112. The MAK 112 is then inputted into the CBC-MAC generator 116 along with the message data 106 to derive the MAC value 118.

For those versed in writing/reading software code, the iterative process of the key derivation mechanism 110 described with respect to FIG. 2 can be summarized with the following pseudocode:

```
Inputs:     Key, n N/2-bit values {K₁, K₂, ..., Kₙ} Key, K
Outputs:    MAK
1)  Initialize variables
        Set A = Length of message in bits or bytes, padded with zeroes to
        N/2 bits (0 || Message Length)
        Set t = 1
        Initialize core key derivation algorithm with Key
        For i = 1 to n
            Rᵢ = Kᵢ
2)  Calculate intermediate values
        For i = 0 to 5
            For j = 1 to n
                B = ECB_Key(A || Rⱼ)
                A = t ⊕MSB_{N/2}(B)
                Rⱼ = LSB_{N/2}(B)
                t = t + 1
3)  Output the results
        Set MAK = (R₁ || R₂ || ... || Rₙ)
```

Once the MAC value 118 is derived, the MAC value 118 is transmitted to the receiving device (not shown) along with the message 102. Upon receipt of the message 102 and the MAC value 118, the receiving device performs a CBC-MAC verification by attempting to independently derive the MAC value 118 using the process described above; it is assumed that the receiving device has the key input 108 stored locally. The receiving device then compares the result of the independently derived MAC value to the received MAC value 118. If the MAC values are the same, the verification is successful, and the message 102 is considered to be authentic. If the MAC values do not match, the verification is unsuccessful, and the message 102 is considered to be inauthentic; preferably inauthentic messages are discarded, or in the alternative, flagged by the receiving device as being unauthentic.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

We claim:

1. A method for authenticating a message, the method comprising the steps of:
   executing in a hardware device a set of instructions that perform:
   generating a message having a message length and comprising message data; identifying a key input;
   deriving a message authentication key using the key input and the message length as inputs;
   deriving a message authentication code using the message authentication key and the message data as inputs; and
   using the message authentication code to authenticate the message.

2. The method of claim 1 wherein the step of deriving the message authentication key comprises inputting the key input and the message length into a key derivation mechanism.

3. The method of claim 2 wherein the key derivation mechanism comprises a key derivation algorithm, and wherein the key derivation algorithm is initialized with the key input.

4. The method of claim 2 wherein the key derivation mechanism comprises a plurality of registers, and wherein at least one register is initialized with the message length and at least one register is initialized with at least a portion of the key input.

5. The method of claim 2 wherein the key derivation algorithm is based on an advanced encryption standard.

6. The method of claim 2 wherein the key derivation algorithm is based on a data encryption standard.

7. The method of claim 2 wherein the key derivation algorithm is based on triple data encryption standard.

8. The method of claim 1 further comprising the steps of transmitting the message and the message authentication code to a receiver, wherein the receiver identifies the key input, and uses the key input with the message length to independently derive the message authentication key and the message authentication code.

9. The method of claim 8 wherein the receiver compares the received message authentication code with the independently derived message authentication code.

10. The method of claim 9 wherein the receiver considers the message to be authentic when the received message authentication code is identical to the independently derived message authentication code.

11. The method of claim 9 wherein the receiver considers the message to be inauthentic when the received message authentication code is not identical to the independently derived message authentication code.

12. A transmitting device comprising a hardware device coupled to a storage medium having stored thereon a set of instructions, which when loaded into the hardware device, causes the hardware device to perform the steps of the method of claim 1.

13. The method of claim 1 wherein the steps are performed in hardware.

14. The method of claim 1 wherein the steps are performed in both software and hardware.

15. A storage medium having stored thereon a set of instructions, which when loaded into a hardware device, causes the hardware device to perform the following functions:
   generate a message having a message length and comprising message data;
   identify a key input;
   derive a message authentication key using the key input and the message length as inputs;
   derive a message authentication code using the message authentication key and the message data as inputs; and
   use the message authentication code to authenticate the message.

16. The storage medium of claim 15 wherein the hardware device is a microprocessor.

* * * * *